Dec. 5, 1967  A. B. NEELY ET AL  3,355,938
LOAD CELL WITH JACK

Filed July 29, 1965  3 Sheets-Sheet 1

INVENTORS:
J. W. MONTGOMERY
A. B. NEELY
BY: *Oswald W. Wilmore*
THEIR ATTORNEY

Dec. 5, 1967   A. B. NEELY ET AL   3,355,938
LOAD CELL WITH JACK

Filed July 29, 1965   3 Sheets-Sheet 2

INVENTORS:
J. W. MONTGOMERY
A. B. NEELY
BY: *Oswald H. Milmore*
THEIR ATTORNEY

United States Patent Office 3,355,938
Patented Dec. 5, 1967

3,355,938
LOAD CELL WITH JACK
Aaron B. Neely and James W. Montgomery, Houston, Tex., assignors to Shell Oil Company, New York, N.Y., a corporation of Delaware
Filed July 29, 1965, Ser. No. 475,643
11 Claims. (Cl. 73—141)

ABSTRACT OF THE DISCLOSURE

Apparatus for measuring the load on the sucker rod of a well pump. A vertically movable supporting hanger bar is mounted on the upper end of the rod and a stop element is fixed mounted on the bar and spaced a fixed distance above the bar. Spacer means, having a portion upwardly movable relative to the bar, is normally supported by the bar. A load cell-jack unit, having a strain gauge for measuring a vertical load, is readily positioned about the spaced means between the stop element and the hanger bar. Bearing surface means, carried by the unit, operatively engages the gauge and is adapted to abut against the spacer means. Jack means carried by the unit is adapted to move downwardly towards the hanger bar to bring the strain gauge into operation whereby stress on the stop element is transferred to the bearing surface means thereby straining the gauge and measuring the load on the sucker rod.

Background of the invention

FIELD OF THE INVENTION

This invention relates to a means for measuring the load carried by a pumping mechanism. More particularly, this invention relates to a means for measuring the pump rod load of a beam-pumping well of the type employed in the production of hydrocarbons. The invention has specific application to the analysis of pumping problems in the operation of sucker rod pumping systems.

Description of the prior art

For pumping deep wells, such as oil wells, a common practice is to employ a series of interconnected rods for coupling an actuating device at the surface with a pump at the bottom of the well. This series of rods, generally referred to as the rod string or sucker rod, has the uppermost rod extending up through the well casinghead for connection with an actuating device, such as a pump jack of the walking beam type, through a coupling device generally referred to as the rod hanger. The well casinghead includes means for permitting sliding action of the uppermost rod which is generally referred to as the "polished rod."

A clamp fitted around the polished rod above the rod hanger abuts the rod hanger and transmits the entire sucker rod load to the hanger. To determine the load on the sucker rod at any one time, a dynamometer load cell containing a strain gauge can be inserted between the polished rod clamp and the rod hanger. To do this, it has been necessary to stop production and move the polished rod clamp to install the load cell. This required a great amount of time and effort on the part of the working crew.

Summary of the invention

The present invention comprises a load cell and jack combination which can be installed on the polished rod and have the weighing done in a fraction of the time previously required. A spacer assembly is permanently positioned between the polished rod clamp and the rod hanger. When a weighing measurement is to be taken, the load cell-jack combination is inserted over the spacer element and the jack transfers the weight from the spacer assembly directly to the load cell. The extent of distortion in the wire of the load cell strain gauge indicates the load acting upon the polished rod.

A preferred embodiment of the load cell-jack combination utilizes hydraulic jacking means. Oil or any other fluid of lower compressibility is transmitted to the jack under pressure by pumping means, such as a hand pump which can be removed once the jack is up. The jack is equipped with a fluid inlet means, to which the pumping means is attached. A valve of any suitable type, e.g., petcock, can be provided at the fluid inlet to control the flow of fluid into the jack and to release the pressure for deactivation of the jack. Since all fluids are compressible to a certain extent, a hydraulic damping effect will occur on load changes during the pumping cycle which can distort measurements taken while the load is supported by the hydraulic jack. To avoid this damping effect, a spacer plate is provided which can be positioned on the apparatus when the hydraulic jack is extended in such a way that it supports the full load upon deactivation of the jack. In this way, solid metal to metal contact is provided for the taking of measurements. To remove the spacer plate, the jack is merely reactivated enough to free the plate from its load-bearing position.

Another embodiment of the load cell-jack combination utilizes mechanical jacking means to eliminate the fluid damping.

Brief description of the drawing

The invention will now be described with reference to the accompanying drawings wherein.

DESCRIPTION OF THE PREFERRED EMBODIMENTS

Figure 1:
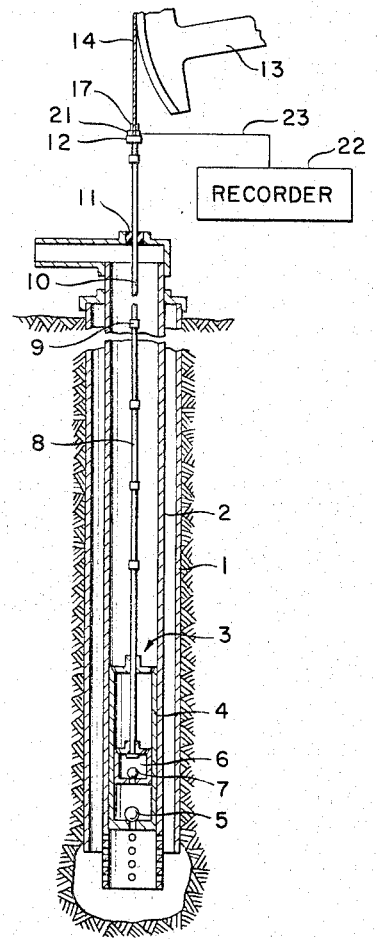
FIGURE 1 is a schematic diagram, partially in longitudinal section, showing the general arrangement of apparatus in a system in accordance with the invention.

Referring to FIGURE 1, there is shown a well having a well casing 1 extending from the surface to the bottom thereof. Positioned within the well casing 1 is a production tubing 2 having a pump 3 located at the lower end. The pump barrel 4 contains a standing valve 5 and a plunger or piston 6 which in turn contains a traveling valve 7. The piston 6 is actuated by a jointed sucker rod 8 that extends from the piston 6 up through the production tubing to the surface and is connected at its upper end by a coupling 9 to a polished rod 10 which extends through a packing joint 11 in the wellhead.

Figure 2:
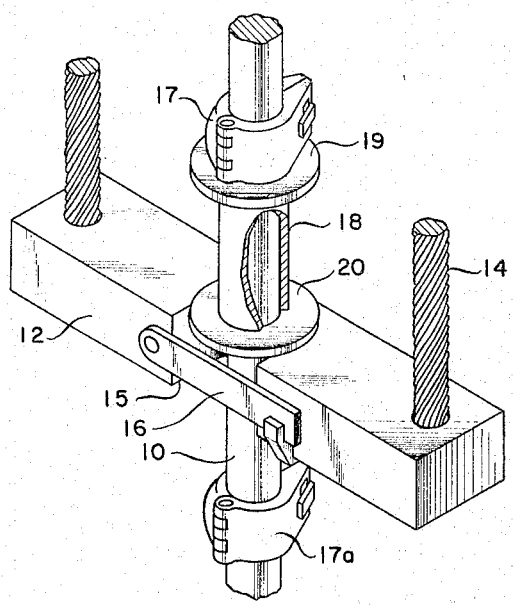
FIGURE 2 is a perspective view showing a portion of the apparatus at the rod hanger.

As best shown in FIGURE 2, the upper end of the polished rod 10 is connected to a hanger bar 12 suspended from a pumping beam 13 by two wire cables 14.

The hanger bar 12 has a U-shaped slot 15 for receiving the polished rod 10. A latching gate 16 prevents the polished rod from moving out of the slot 15. Permanently mounted over the polished rod between the hanger bar 12 and the polished rod clamp 17 is a spacer sleeve 18. Over the polished rod at both ends of the spacer sleeve 18 are bearing washers 19 and 20, having substantially the same inside diameter as the sleeve and in abutment respectively with the clamp 17 and bar 12. The load cell-jack combination 21 is designed to slide over the spacer sleeve 18 between the bearing washers 19 and 20. Clamp 17a serves as a vertical stop for hanger bar 12.

Figure 5:
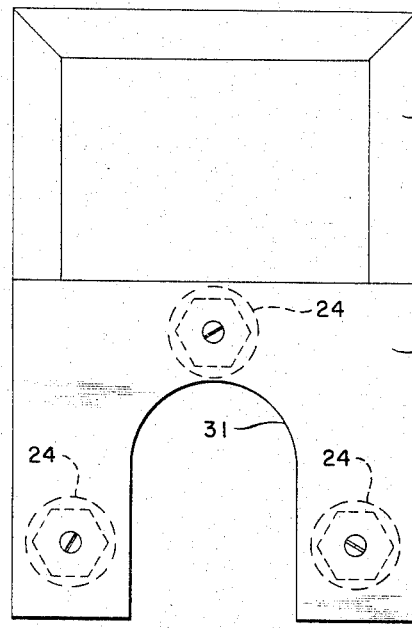
FIGURE 5 is a plan of the device shown in FIGURE 4 showing one possible arrangement for the strain gauges.

The strain-gauge load cell of the combination is a conventional device and operates in a manner well known to those in the art. When the polished rod load is transferred to the load cell, the resistance of the wire (not shown) of the strain gauges 24 is altered proportionally to the load. As the hanger bar 12 moves up and down with the load cell-jack combination in operating position, an electrical signal which relates strain-gauge resistance to polished rod load can be transmitted from the load cell to a recorder 22 via an electrical circuit 23 as shown in FIGURE 1. A suitable arrangement for placing the strain gauges 24 within the load cell is shown in FIGURE 5, wherein their relative positions are shown.

Figure 3:
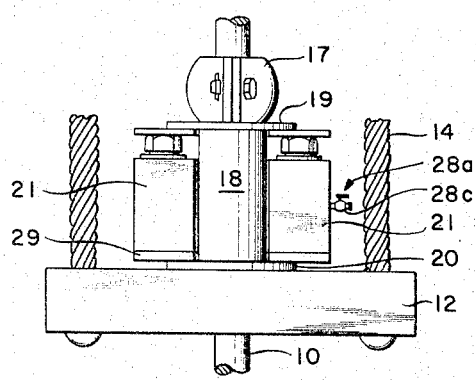
FIGURE 3 is a frontal view of the portion of the apparatus shown in FIGURE 2 with the load cell-jack combination in place.
Figure 6:
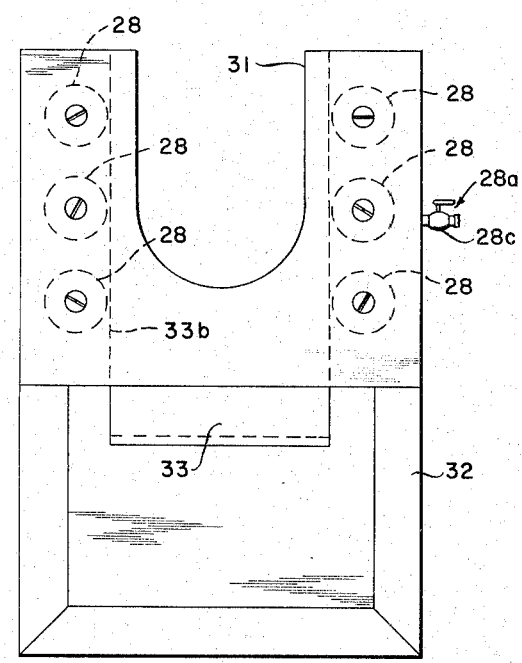
FIGURE 6 is a bottom view of the device shown in FIGURE 4 showing one possible arrangement for the jacking elements.
Figure 4:
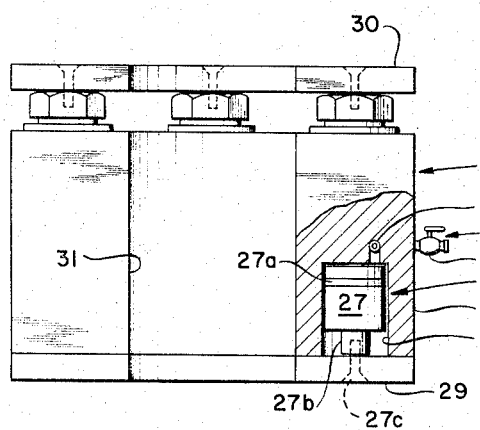
FIGURE 4 is a frontal view of the load cell-jack combination partially in section to show one of the jacking elements.

FIGURE 3 shows the load cell-jack combination 21 in place over the sleeve 18. FIGURES 4–6 show more detailed views of the load cell-jack combination 21 designating the relative positions of its parts in exemplary arrangements. The jacking means 25 comprises a block 26 having a plurality of e.g., six cylindrical bores 28 each containing a hydraulically-actuated piston 27 having a seal 27a. The cylindrical bores 28 are connected to a coupling 28a by bores 28b. When a fluid under pressure is forced into the fluid inlet coupling 28a, through valve means 28c, enough fluid enters cylinder 28 to drive the pistons 27 downwardly. The pistons are provided with extensions 27b that project beneath the block 26 when the pistons move downwardly. These extensions are connected by screws 27c to bearing plate 29 which separates from the block 26. This block has at the top a plurality of wells, open at the top, for receiving the strain gauges 24 and a bearing plate 30 is connected to the tops of the load cells. The block 26, plate 29 and plate 30 are formed with a channel 31, e.g., U-shaped, which is large enough to allow the combination to fit over spacer sleeve 18. For ease of handling, the load cell-jack combination is provided with a handle 32.

Spacer sleeve 18 and bearing washers 19 and 20 are permanently mounted over the polished rod 10 between the polished rod clamp 17 and hanger bar 12, bearing the full load acting on the polished rod. When a measurement of polished rod load is required, the load cell-jack combination 21 is inserted over spacer sleeve 18 and between bearing washers 19 and 20 with the sleeve 18 within the channel 31. Hydraulic pressure means, such as a hand-actuated oil pump, are then connected to the inlet 28a and fluid is pumped into the cylinders 28 through valve means 28c causing bearing plate 29 to separate from the jack body as the piston members 27 move downwardly within cylinders 28. Once the bearing members 29 and 30 are in contact with their respective bearing washers 20 and 19 (preferably they are in free sliding contact with these washers when the load cell-jack combination is inserted over spacer sleeve 18), the hydraulic jack lifts the washer 19 away from spacer sleeve 18 so that the full polished rod load is transferred from the spacer sleeve to the load cell-jack combination. Valve means 28c is then closed and the hydraulic pressure means can be removed. A reading of the load cell can now be taken.

Figure 7:
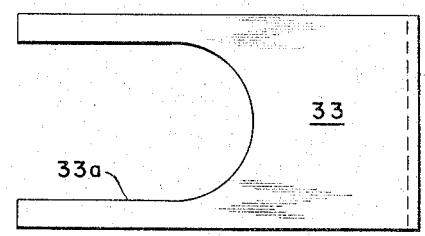
FIGURE 7 shows a plan of a spacer plate for the device shown in FIGURES 4–6.

However, it may be desirable to have solid metal to metal contact when measuring polished rod load so as to eliminate hydraulic damping. As loads change rapidly during the pumping cycle, the hydraulic jack acts as a shock absorber. This can cause some inaccuracy in the recorded measurements. Thus, it is desirable to provide some means by which a solid metal to metal contact can be achieved to effect a true measurement. A flat spacer plate 33, having a recess 33a of U-shaped cross-section as shown in FIGURE 7 is provided for this purpose. When the piston members 27 are in their extended positions, a vertical space is created between the jack body and bearing plate 29; spacer plate 33 can be inserted into this space above the plate 29 and around spacer sleeve 18, so that the legs of the plate extend between the sleeve and the pistons as shown by dotted line 33b in FIGURE 6. Once the spacer plate 33 is in place, the hydraulic pressure actuating means are deenergized, permitting inward movement of the pistons and transferring the polished rod load from the block 26 to the washer 20 directly via the plate.

After a reading has been taken, the jacking means are once again energized so that the spacer plate can be removed. Once the plate is removed, the jacking means is deenergized, transferring the polished rod load back to the spacer sleeve 18. The valve means 28c can be eliminated if the spacer plate is always used and no hydraulic measurement is taken directly.

The load cell can be installed on the polished rod in less than one minute and the well weighing completed in about ten minutes using the load cell-jack combination of the present invention. Previously, well weighing required thirty to forty-five minutes most of which involved moving the polished rod clamp to install the load cell and waiting for the well to stabilize. With the instant device, delay time waiting for the well to stabilize is usually eliminated. The permanent equipment to be installed on each well to receive the load cell and jack is nominal and only one load cell-jack combination is required.

Although the invention has been described with reference to a hydraulic jacking means, it need not be so limited. Any form of mechanical jacking means, e.g., gear driven jacking means, would be alternative and considered to be within the scope of this invention. A mechanical jacking means would eliminate the need for a spacer plate to create a non-compressible weighting means.

Figure 9:
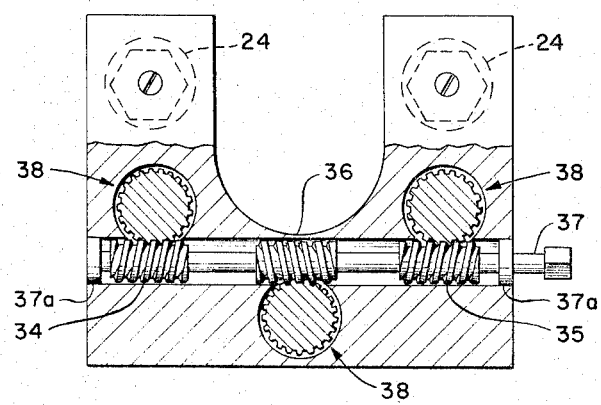
FIGURE 9 is a plan of the device shown in FIGURE 8, partially in section to show portions of the mechanism.
Figure 8:
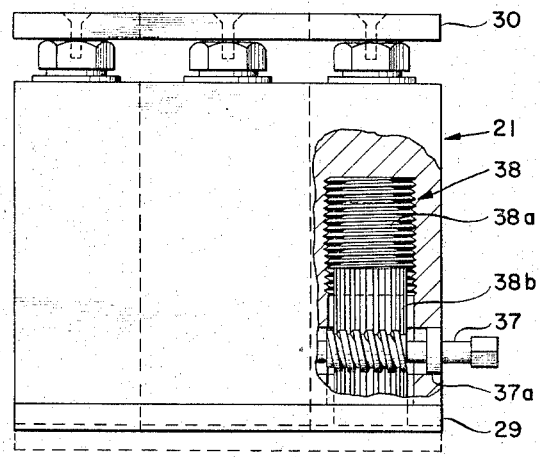
FIGURE 8 is an enlarged rear view of a modified embodiment using a mechanical jacking arrangement, partially in section to show one of the jacking elements.

One such mechanical jacking means arrangement is shown in FIGURES 8 and 9. This particular design is very similar to the overall load cell-jack combination design utilizing hydraulic jacking means and is adapted to fit over spacer element 18 in the same way. Referring now to FIGURES 8 and 9, three worm gears 34, 35 and 36 are mounted upon an input shaft 37 rotatably mounted on bearing members 37a within the combination housing. One end of shaft 37 extends outside the housing where it is connected to a drive mechanism (not shown), such as a socket wrench of any suitable type. In driving relationship to the worm gears 34, 35 and 36 are jacking elements 38 which are threaded and mounted within the jack housing at one end thereof 38a. At the other end thereof 38b, is a long gear element of slight pitch which makes the driving connection with a worm gear. As best shown in FIGURE 9, the pitch on worm gears 34 and 35 are the same and drive their respective jacking elements in the same direction when rotated. Worm gear 36 has its jacking element on the opposite side of shaft 37 from the other two and, thus, has a reverse pitch for driving its respective jacking element in synchronism with the other two jacking elements. This forms a tripodal jacking system in combination with the load cell. When the drive mechanism is activated, shaft 37 rotates, turning the worm gears mounted thereon. As the worm gears turn, they cause the jacking elements 38 to move from retracted positions within the jack housing to extended positions as shown by the dotted lines in FIGURE 8, moving bearing plate 29 downwardly away from the jack housing as done in the hydraulic system. As best shown by FIGURE 8, when the driving mechanism is activated, portion 38a of the jacking elements screws downwardly as portion 38b slides downwardly along the threads of the worm gear as the jacking element 38 is rotated thereby. This provides the jacking action which moves jacking elements 38 into an extended position, thereby transferring the polished rod load from the spacer element 18 to the load cell-jack combination 21 for taking load measurements. After such measurements are taken, the driving mechanism is deactivated, transferring the polished rod load back to the spacer element. The load cell-jack combination is then removed from the pumping system.

Although one particular mechanical jacking arrangement has been shown, there are many possible arrangements which could be shown without departing from the scope of the invention.

Thus, a simplified means for weighing pump rod load on well pumping mechanism has been disclosed and is intended to be covered by the following claims.

We claim as our invention:

1. A device adapted to be removably attached between a vertically movable supporting hanger bar mounted on the sucker rod of a well pump and a stop element fixedly mounted on the rod and spaced a fixed distance above the bar, and spacer means between the stop element and hanger bar normally supported by the bar and having at least a portion thereof movable relative to said bar, said device comprising:

housing means containing at least one strain gauge for measuring a vertical load on the housing means;

bearing surface means carried by said housing means and abutting against said spacer means;

jack means carried by said housing means and adapted to move downwardly towards said hanger bar; and said housing means being adapted to be inserted on said spacer means between said stop element and said hanger bar whereby the stress on said stop element is transferred to the bearing surface means when said jack means is actuated to move toward said hanger bar, thereby straining said gauge and measuring the load on said sucker rod.

2. Apparatus for measuring the load on the sucker rod of a well pump comprising:

a vertically movable supporting hanger bar mounted on the upper end of said sucker rod;

a stop element fixedly mounted on said rod and spaced a fixed distance above the bar;

spacer means normally supported by the bar and having a portion thereof upwardly movable relative to the bar;

a load cell-jack unit containing at least one strain gauge for measuring a vertical load mounted about said spacer means and between said stop element and said hanger bar, the vertical dimension of said load cell-jack unit being less than that of the spacer means whereby the unit can be readily slipped on the spacer means;

bearing surface means carried by said unit and operatively engaging said gauge;

said bearing surface means being adapted to abut against said spacer means; and jack means carried by said unit and adapted to move towards said hanger bar whereby stress on said stop element is transferred to the bearing surface means, thereby straining said gauge and measuring the load on said sucker rod.

3. The device of claim 1 wherein said jack means includes an abutment portion and movable engaging means movable outwardly therefrom upon movement of the jack means, said jack means being expandable by hydraulic pressure and including hydraulic pressure means for applying hydraulic pressure to effect the expansion and contraction of said movable engaging means, and a transfer member located adjacently to said engaging means when the jack means is expanded providing a non-compressible support against said abutment portion when the jack means is contracted.

4. The combination according to claim 1 wherein jack means includes said abutment portion in the form of a flat surface of the jack means with recesses and said jack means further including movable engaging means mounted for reciprocal movement between a retracted position within the recesses of said surface and an extended position upon expansion of the jack means.

5. The combination according to claim 1 wherein said jack means is mechanically operated and includes mechanical drive means providing a non-compressible support between said bearing surface means and said housing means.

6. The combination according to claim 5 wherein said jack means consists of a base with a worm gear input drive means rotatably mounted therein, a plurality of engaging means movable outwardly from said base against said bearing surface means, and gear means on each engaging means to connect with said drive means to move said engaging means to an extended position.

7. The apparatus of claim 1 wherein the spacer means includes a sleeve member having a wide flange ring element at the upper end thereof upwardly movable relative to the bar.

8. The apparatus of claim 2 wherein the jack means includes engaging elements coupled to the bearing surface means and movable from a retracted position to an extended position away from the unit, said bearing surface means being movable therewith; and recesses within the unit for receiving the engaging elements in their retracted position.

9. The apparatus of claim 8 including a U-shaped transfer plate located between the bearing surface means and the unit.

10. The apparatus of claim 8 wherein said recesses are cylinders; said engaging elements are pistons slidably mounted therein; and said jack means are hydraulically actuated by hydraulic pressure means, being comprised of pressure inlet means; fluid transmitting passages leading to the cylinders; and pressure seals on said pistons, said pistons moving outwardly within the recesses to an extended position outside the unit upon actuation of the hydraulic pressure means.

11. The apparatus of claim 8 wherein said recesses are cylindrical and partially threaded; said engaging elements are threaded and screwed into the threaded portions of said cylindrical recesses; and said jack means are mechanically actuated, being comprised of a drive shaft extending through said unit and worm gears mounted upon said shaft in driving relationship to said engaging elements, said engaging elements screwing outwardly from the recesses to an extended position outside the unit upon rotation of said shaft.

References Cited

UNITED STATES PATENTS

| | | | |
|---|---|---|---|
| 2,214,440 | 9/1940 | Rothery | 254—1 |
| 1,487,940 | 3/1924 | Halsey | 254—103 |
| 2,472,047 | 5/1949 | Ruge | 73—141 |

FOREIGN PATENTS 650,259  10/1962  Canada.

OTHER REFERENCES

E. Lodynski, Dynamometer for Deep Well Use, Aug. 1, 1960, pp. 1–7.

Friedrich Leutert, Luneburg-Erbstorf, Germany.

RICHARD C. QUEISSER, *Primary Examiner.*

JAMES GILL, *Examiner.*

DOUGLAS SCHEIDER, *Assistant Examiner.*